(12) United States Patent
Zhao et al.

(10) Patent No.: US 10,554,230 B2
(45) Date of Patent: Feb. 4, 2020

(54) SIGNAL TRANSMISSION METHOD IN RADIO FREQUENCY NETWORK, RADIO FREQUENCY SYSTEM, AND DETECTION DEVICE

(71) Applicant: HUAWEI TECHNOLOGIES CO., LTD., Shenzhen (CN)

(72) Inventors: Hu Zhao, Shenzhen (CN); Hongwei Xing, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/381,133

(22) Filed: Apr. 11, 2019

(65) Prior Publication Data
US 2019/0238162 A1 Aug. 1, 2019

Related U.S. Application Data

(63) Continuation of application No. PCT/CN2016/101824, filed on Oct. 11, 2016.

(51) Int. Cl.
*H04W 4/02* (2018.01)
*H04B 1/00* (2006.01)
*H04W 88/08* (2009.01)

(52) U.S. Cl.
CPC ............ *H04B 1/006* (2013.01); *H04W 88/08* (2013.01)

(58) Field of Classification Search
CPC ............ H04W 72/042; H04W 72/10; H04W 72/0446; H04W 52/08; H04W 88/08; H04L 5/0051; H04B 1/006
(Continued)

(56) References Cited

U.S. PATENT DOCUMENTS

| 2014/0002316 | A1 | 1/2014 | Liu | |
| 2015/0340769 | A1* | 11/2015 | Desclos | H01Q 21/0006 343/745 |

(Continued)

FOREIGN PATENT DOCUMENTS

| CN | 102013927 A | 4/2011 |
| CN | 102593570 A | 7/2012 |

(Continued)

*Primary Examiner* — Phuoc H Doan
(74) *Attorney, Agent, or Firm* — Kilpatrick Townsend & Stockton LLP (57) ABSTRACT

The present application discloses a signal transmission method, includes: obtaining, by the detection device, port information and switch information of the at least one antenna line device, and port information and switch information of the antenna; sequentially controlling, by the detection device based on the switch information, at least one switch of the at least one antenna line device to perform state switching, performing port scanning, and recording a scanned port and a corresponding switch state; and determining, by the detection device, a port connection relationship of devices in the radio frequency network based on port and switch state information obtained after a plurality of times of state switching and a plurality of times of port scanning, and the port information. Therefore, the detection device controls switch switching of the devices in the radio frequency network to obtain the port connection relationship of the devices in the radio frequency network.

20 Claims, 7 Drawing Sheets

(58) Field of Classification Search
USPC .................. 370/329, 315, 336; 455/456.1
See application file for complete search history.

(56) References Cited

U.S. PATENT DOCUMENTS

2017/0064570 A1    3/2017  Shen et al.
2019/0115958 A1*   4/2019  Liang .................. H04B 7/0456

FOREIGN PATENT DOCUMENTS

| CN | 103384962 A | 11/2013 |
|----|-------------|---------|
| EP | 2943025 A1 | 11/2015 |
| EP | 3136773 A1 | 3/2017 |
| WO | 2010134861 A1 | 11/2010 |
| WO | 2012136159 A2 | 10/2012 |
| WO | 2015172307 A1 | 11/2015 |

* cited by examiner

SIGNAL TRANSMISSION METHOD IN RADIO FREQUENCY NETWORK, RADIO FREQUENCY SYSTEM, AND DETECTION DEVICE

CROSS-REFERENCE TO RELATED APPLICATIONS

This application is a continuation of International Application No. PCT/CN2016/101824 filed on Oct. 11, 2016, the disclosure of which is hereby incorporated by reference in its entirety.

TECHNICAL FIELD

The present application relates to the wireless communications field, and more specifically, to a signal transmission method in a radio frequency network, a radio frequency system, and a detection device.

BACKGROUND

Development of mobile communications is accompanied with an ever increasing demand for data services, and the communications industry is continuously searching for a method for expanding a data capacity. Increasing a capacity by adding a frequency band and using cell splitting has become a current trend. Accordingly, a quantity of antenna ports on a single site is increased, a quantity of devices in a feeder network is continuously increased, a quantity of base stations is increased, and consequently complexity of installing, configuring, and maintaining an antenna feeder system is increased. Whether a device connection topology is correct directly affects a function and performance of a network. In a later period, there are problems such as a long period and low problem detection determining accuracy during a network drive test. An auxiliary detection function of a primary device can be detected only in some scenarios, and a connection relationship between links in a topology network cannot be obtained.

SUMMARY

Embodiments of the present application provide a signal transmission method in a radio frequency network, a radio frequency system, and a detection device to obtain a port connection relationship of devices in the radio frequency network.

According to a first aspect, a signal transmission method in a radio frequency network is provided, where the radio frequency network includes a detection device, at least one antenna line device, and an antenna that are sequentially connected in series through a radio frequency channel, and the method includes:

obtaining, by the detection device, port information and switch information of the at least one antenna line device, and port information and switch information of the antenna;

sequentially controlling, by the detection device based on the switch information, at least one switch of the at least one antenna line device to perform state switching, performing port scanning each time after the state switching is performed, and recording a scanned port and a corresponding switch state; and determining, by the detection device, a port connection relationship of devices in the radio frequency network based on port and switch state information obtained after a plurality of times of state switching and a plurality of times of port scanning, and the port information.

Therefore, the detection device controls switch switching of the devices in the radio frequency network for a plurality of times, and performs port scanning, so that the port connection relationship of the devices in the radio frequency network can be determined based on the scanned port and the corresponding switch state.

Optionally, in an implementation of the first aspect, the state switching includes switching from a disconnected state to a connected state, or switching from a connected state to a disconnected state.

Optionally, in an implementation of the first aspect, the port information of the at least one antenna line device includes a port number of each of a plurality of ports of the at least one antenna line device, and the port information of the antenna includes a port number of each of a plurality of ports of the antenna.

Optionally, in an implementation of the first aspect, the port information of the at least one antenna line device further includes a frequency band corresponding to each of the plurality of ports of the at least one antenna line device, and the port information of the antenna further includes a frequency band corresponding to each of the plurality of ports of the antenna.

Optionally, in an implementation of the first aspect, before the detection device sequentially controls, based on the switch information, the at least one switch of the at least one antenna line device to switch from the first state to a second state, the method further includes:

sending an enabling signal to the at least one antenna line device, so that the at least one antenna line device enters a to-be-detected state based on the enabling signal.

Optionally, in an implementation of the first aspect, the detection device includes a radio remote unit (RRU) or a handheld test device.

Optionally, in an implementation of the first aspect, the at least one antenna line device includes a divider, a combiner, a coupler, or a tower mounted amplifier.

According to a second aspect, a detection device is provided, where the detection device may be configured to perform the method in the first aspect and the implementations, and the detection device includes an obtaining unit and a processing unit. The obtaining unit is configured to obtain port information and switch information of at least one antenna line device, and port information and switch information of an antenna. The processing unit is configured to: sequentially control, based on the switch information, at least one switch of the at least one antenna line device to perform state switching, perform port scanning each time after the state switching is performed, and record a scanned port and a corresponding switch state; and determine a port connection relationship of devices in the radio frequency network based on port and switch state information obtained after a plurality of times of state switching and a plurality of times of port scanning, and the port information.

According to a third aspect, a detection device is provided. The detection device may be configured to perform the method in the first aspect and the implementations. The detection device includes a receiver, a transmitter, a memory, and a processor. The memory may be configured to store port information, switch information, and the like, and may be further configured to store code executed by the processor. The processor is configured to: obtain port information and switch information of the at least one antenna line device, and port information and switch information of the antenna; sequentially control, based on the switch information, at least one switch of the at least one antenna line device to perform state switching, perform port scanning each time after the state switching is performed, and record a scanned port and a corresponding switch state; and determine a port connection relationship of devices in the radio frequency network based on port and switch state information obtained after a plurality of times of state switching and a plurality of times of port scanning, and the port information.

According to a fourth aspect, a signal transmission method in a radio frequency network is provided, where the radio frequency network includes a detection device, at least one antenna line device, and an antenna that are sequentially connected in series through a radio frequency channel, and the method includes: receiving, by the at least one antenna line device, a control signal sent by the detection device; and performing, by the at least one antenna line device based on the control signal, state switching on at least one port of the at least one antenna line device.

Therefore, the antenna line device switches a switch state based on the control signal sent by the detection device, so that the detection device can determine a port connection relationship of devices in the radio frequency network based on a scanned port and a corresponding switch state.

Optionally, in an implementation of the fourth aspect, the state switching includes switching from a disconnected state to a connected state, or switching from a connected state to a disconnected state.

Optionally, in an implementation of the fourth aspect, port information of the at least one antenna line device includes a port number of each of a plurality of ports of the at least one antenna line device, and port information of the antenna includes a port number of each of a plurality of ports of the antenna.

Optionally, in an implementation of the fourth aspect, the port information of the at least one antenna line device further includes a frequency band corresponding to each of the plurality of ports of the at least one antenna line device, and the port information of the antenna further includes a frequency band corresponding to each of the plurality of ports of the antenna.

Optionally, in an implementation of the fourth aspect, before the receiving, by the at least one antenna line device, a control signal sent by the detection device, the method further includes: receiving an enabling signal sent by the detection device, and entering a to-be-detected state based on the enabling signal.

Optionally, in an implementation of the fourth aspect, the detection device includes a radio remote unit RRU or a handheld test device.

Optionally, in an implementation of the fourth aspect, the at least one antenna line device includes a divider, a combiner, a coupler, or a tower mounted amplifier.

According to a fifth aspect, a radio frequency system is provided, where the radio frequency system includes a detection device, at least one antenna line device, and an antenna that are sequentially connected in series through a radio frequency channel, and the detection device is configured to:

obtain port information and switch information of the at least one antenna line device, and port information and switch information of the antenna;

sequentially control, based on the switch information, at least one switch of the at least one antenna line device to perform state switching, perform port scanning each time after the state switching is performed, and record a scanned port and a corresponding switch state; and determine a port connection relationship of devices in the radio frequency system based on port and switch state information obtained after a plurality of times of state switching and a plurality of times of port scanning, and the port information.

Therefore, the detection device controls switch switching of the devices in the radio frequency system for a plurality of times, and performs port scanning, so that the port connection relationship of the devices in the radio frequency system can be determined based on the scanned port and the corresponding switch state.

Optionally, in an implementation of the fifth aspect, the state switching includes switching from a disconnected state to a connected state, or switching from a connected state to a disconnected state.

Optionally, in an implementation of the fifth aspect, the port information of the at least one antenna line device includes a port number of each of a plurality of ports of the at least one antenna line device, and the port information of the antenna includes a port number of each of a plurality of ports of the antenna.

Optionally, in an implementation of the fifth aspect, the port information of the at least one antenna line device further includes a frequency band corresponding to each of the plurality of ports of the at least one antenna line device, and the port information of the antenna further includes a frequency band corresponding to each of the plurality of ports of the antenna.

Optionally, in an implementation of the fifth aspect, before the detection device sequentially controls, based on the switch information, the at least one switch of the at least one antenna line device to switch from the first state to a second state, the detection device is further configured to send an enabling signal to the at least one antenna line device, so that the at least one antenna line device enters a to-be-detected state based on the enabling signal.

Optionally, in an implementation of the fifth aspect, the detection device includes a radio remote unit RRU or a handheld test device.

Optionally, in an implementation of the fifth aspect, each antenna line device includes a divider, a combiner, a coupler, or a tower mounted amplifier.

Based on the solutions in the embodiments of the present application, the detection device may control switch switching of the devices in the radio frequency network to obtain the port connection relationship of the devices in the radio frequency network.

BRIEF DESCRIPTION OF DRAWINGS

To describe the technical solutions in the embodiments of the present application more clearly, the following briefly describes the accompanying drawings required for describing the embodiments or the prior art. Apparently, the accompanying drawings in the following description show merely some embodiments of the present application, and a person of ordinary skill in the art may further derive other drawings from these accompanying drawings without creative efforts.

DESCRIPTION OF EMBODIMENTS

The following clearly describes the technical solutions in the embodiments of the present application with reference to the accompanying drawings in the embodiments of the present application. Apparently, the described embodiments are some but not all of the embodiments of the present application. All other embodiments obtained by a person of ordinary skill in the art based on the embodiments of the present application without creative efforts shall fall within the protection scope of the present application.

Figure 1:
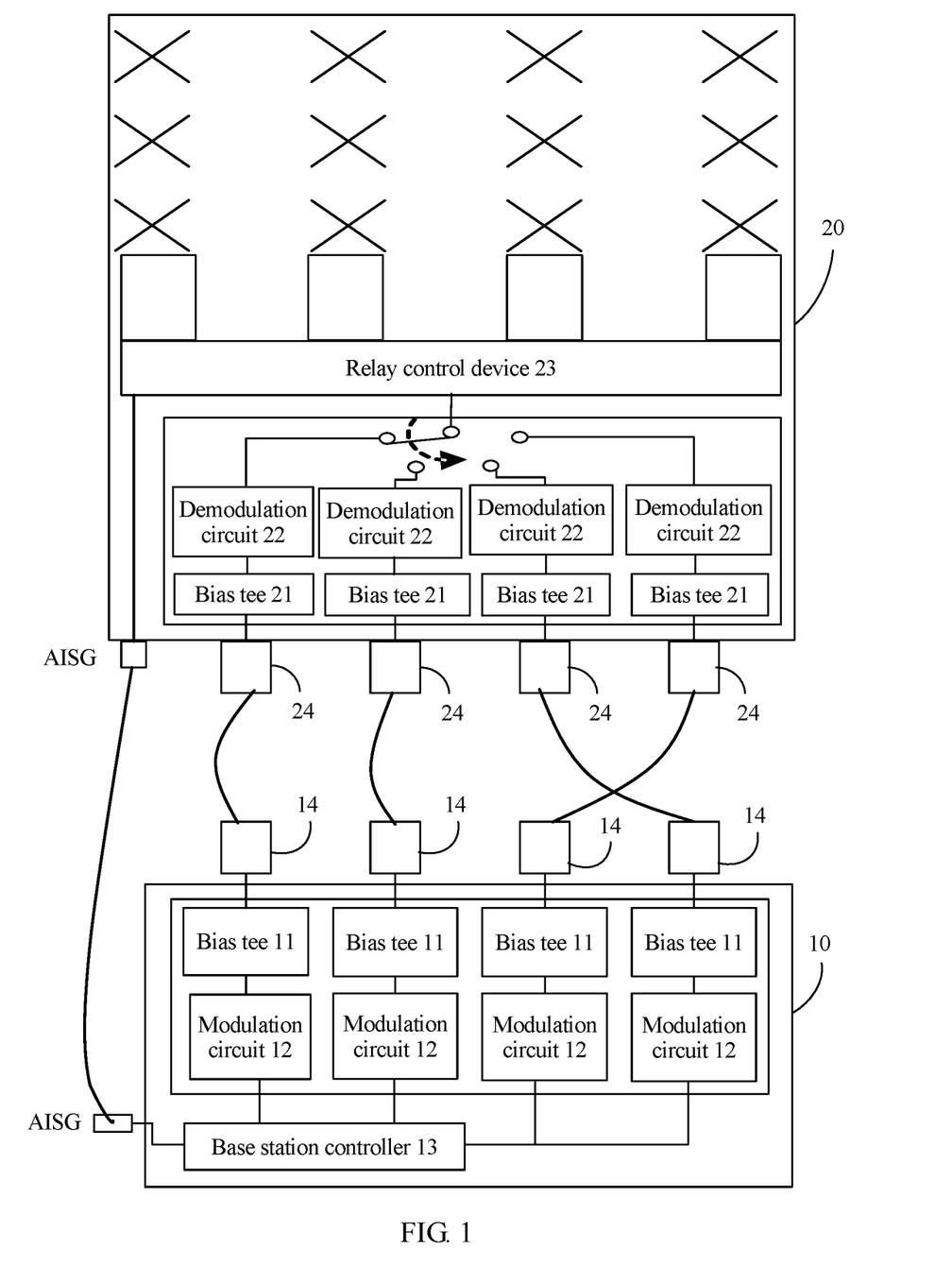
FIG. 1 is a schematic diagram of a system architecture according to an embodiment of the present application.

FIG. 1 is a schematic diagram of a system architecture according to an embodiment of the present application. FIG. 1 shows a base station 10 and an antenna 20. The base station 10 includes a bias tee 11, a modulation circuit 12, a base station controller 13, and a radio frequency port 14. A quantity of bias tees 11 and a quantity of modulation circuits 12 are the same as a quantity of radio frequency ports 14 in the base station 10. The antenna 20 includes a bias tee 21, a demodulation circuit 22, a remote control unit (RCU) 13, and a radio frequency port 24. A quantity of the bias tees 21 and a quantity of demodulation circuits 22 are the same as a quantity of radio frequency ports 24 in the antenna 20.

In the base station 10, an input end of the modulation circuit 12 is connected to a direct current power supply, an output end of the modulation circuit 12 is connected to a direct current input end of the bias tee 11, and a control end of the modulation circuit 12 is connected to an output end of the base station controller 13. The modulation circuit is configured to generate a modulated detection signal. A radio frequency signal is input to an alternating current input end of the bias tee 11, and an output end of the bias tee 11 is connected to the radio frequency port of the base station. The T-type bias tee is configured to couple the detection signal with the radio frequency signal to obtain a coupled signal, and transmit the coupled signal to a corresponding antenna by using the radio frequency port of the base station 10, so that the antenna demodulates the coupled signal, and uploads feedback information to the base station by using an Antenna Interface Standards Group (AISG) input port. The feedback information includes identifier information of a radio frequency port, of the antenna, that receives the coupled signal. The base station controller 13 is configured to: control the modulation circuit to generate the detection signal, receive the feedback information, and establish a correspondence between a sector of the base station and the antenna based on the feedback information.

Figure 2:
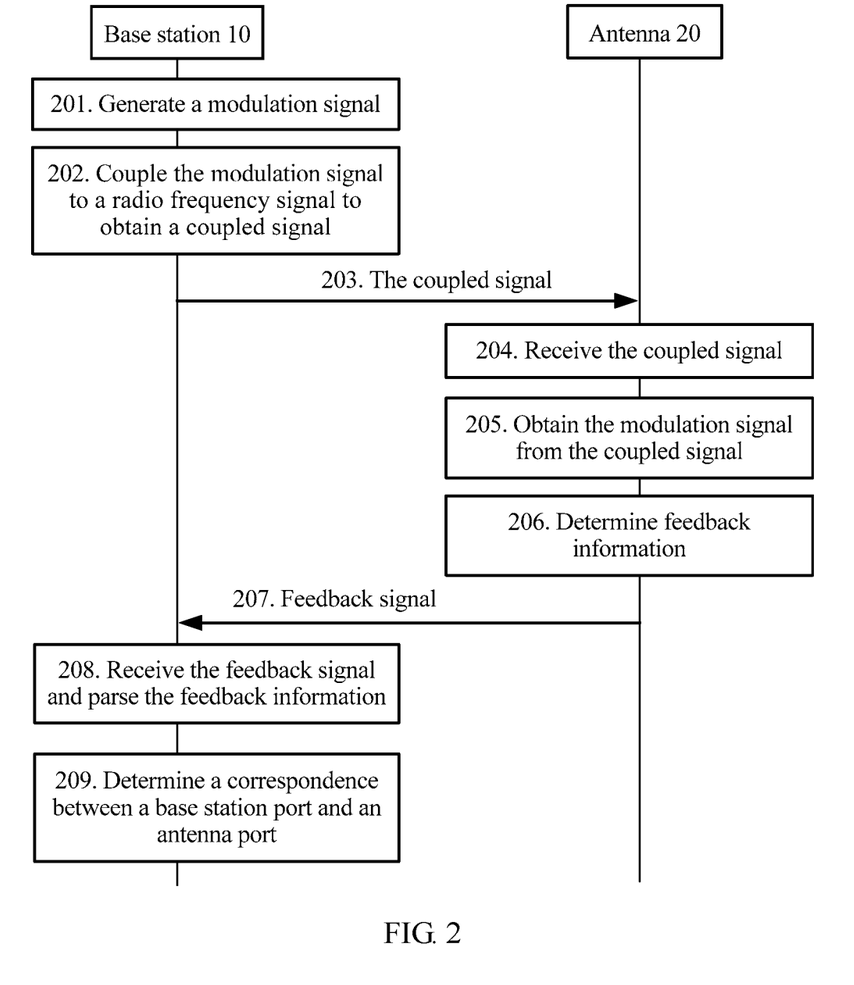
FIG. 2 is an interaction flowchart of a method for determining a correspondence between a base station and an antenna in the prior art.

The base station 10 determines a correspondence between a port of the base station 10 and a port of the antenna 20. For details, refer to a method shown in FIG. 2. FIG. 2 is an interaction flowchart of a method for determining a correspondence between a base station and an antenna in the prior art. As shown in FIG. 2, the process is as follows.

201. The base station 10 generates a detection signal.
202. The base station 10 couples the detection signal with a radio frequency signal to obtain a coupled signal.

203. The base station 10 sends the coupled signal to the antenna 20.

Specifically, the base station 10 transmits the coupled signal to the antenna 20 by using a radio frequency port 14 of the base station 10.

204. The antenna 20 receives the coupled signal sent by the base station 10.

Specifically, the antenna 20 receives the coupled signal by using a radio frequency port 24 of the antenna 20.

205. The antenna 20 separates the coupled signal, and obtains the detection signal from the coupled signal.

206. The antenna 20 determines feedback information.

Specifically, the antenna 20 generates the feedback information based on the detection signal and identifier information corresponding to the radio frequency port 24, of the antenna 20, that receives the coupled signal.

207. The antenna 20 sends the feedback information to the base station 10.

208. The base station 10 receives the feedback information and parses the feedback information.

Specifically, the base station 10 parses the feedback information to obtain the identifier information corresponding to the radio frequency port 24 of the antenna 20.

209. The base station 10 determines a correspondence between the port 14 of the base station 10 and the port 24 of the antenna 20.

Specifically, after receiving the feedback information, the base station 10 may establish, based on the identifier information of the radio frequency port 24 of the antenna 20, a correspondence between the radio frequency port 24 and the radio frequency port 14, of the base station 10, that sends the coupled signal, so as to obtain a correspondence between a sector of the base station and the antenna.

However, in this way, only a correspondence between a port of a main device (for example, a base station) and an antenna port can be determined, and a connection relationship between other antenna line devices on an entire line between the main device and the antenna cannot be determined. Therefore, ports of these antenna line devices cannot be detected. When a fault such as a connection error occurs on the line between the main device and the antenna, a specific location at which the fault occurs cannot be determined, a problem occurring on a topology connection in a radio frequency network cannot be specifically located, and fast determining of an on-site problem cannot be implemented.

According to a method in an embodiment of the present application, when detecting a radio frequency network, a device connection relationship in the radio frequency network can be obtained, so that when a connection error occurs on a network connection, a specific location of the connection error can be detected.

Figure 3:
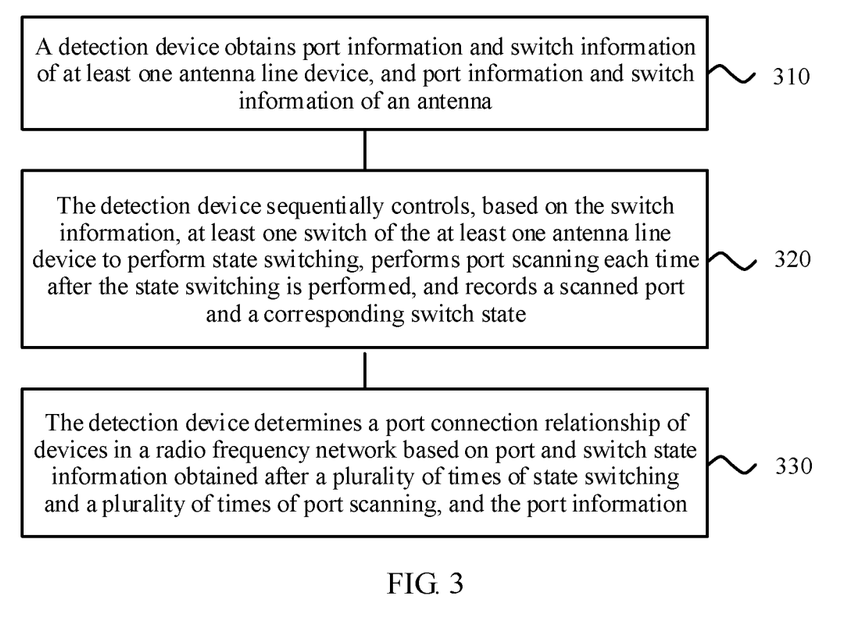
FIG. 3 is a schematic flowchart of a signal transmission method in a radio frequency network according to an embodiment of the present application.

FIG. 3 is a schematic flowchart of a signal transmission method in a radio frequency network according to an embodiment of the present application. As shown in FIG. 3, the radio frequency network includes a detection device, at least one antenna line device, and an antenna that are sequentially connected in series through a radio frequency channel. The method includes the following steps.

310. The detection device obtains port information and switch information of the at least one antenna line device, and port information and switch information of the antenna.

320. The detection device sequentially controls, based on the switch information, at least one switch of the at least one antenna line device to perform state switching, performs port scanning each time after the state switching is performed, and records a scanned port and a corresponding switch state.

330. The detection device determines a port connection relationship of devices in the radio frequency network based on port and switch state information obtained after a plurality of times of state switching and a plurality of times of port scanning, and the port information.

The detection device may include, for example, a radio remote unit (RRU) or a handheld test device. The antenna line device may include, for example, a divider, a combiner, a coupler, or a tower mounted amplifier. Types of the detection device and the antenna line device are not limited in this embodiment of the present application.

Specifically, the detection device obtains the port information and the switch information of the at least one antenna line device, and the port information and the switch information of the antenna, and sequentially controls, based on the obtained switch information, the at least one switch to perform state switching, for example, sequentially sends a control signal to the at least one antenna line device to control the at least one switch to perform state switching. Each time after controlling at least one switch to perform state switching, the detection device performs port scanning in the at least one antenna line device and the antenna device, and records a port scanned each time and a corresponding switch state. Therefore, the detection device determines a port connection condition of the devices in the radio frequency network based on port and switch state information obtained after a plurality of times of state switching and a plurality of times of port scanning, and the previously obtained port information.

Optionally, the state switching includes switching from a disconnected state to a connected state, or switching from a connected state to a disconnected state.

Optionally, the port information of the at least one antenna line device includes a port number of each of a plurality of ports of the at least one antenna line device, and the port information of the antenna includes a port number of each of a plurality of ports of the antenna.

Optionally, the port information of the at least one antenna line device further includes a frequency band corresponding to each of the plurality of ports of the at least one antenna line device, and the port information of the antenna further includes a frequency band corresponding to each of the plurality of ports of the antenna.

For example, all switches in the radio frequency network are initially in a connected state. The detection device may control a first switch to disconnect, and perform port scanning to obtain a port and a switch state that can be scanned this time. When controlling a second switch next time to disconnect, the detection device enables the first switch to restore the initial connected state, and after controlling the second switch to disconnect, performs port scanning again to obtain a port and a switch state that can be scanned. The detection device can perform the process for a plurality of times, to obtain port and switch state information obtained after a plurality of times of state switching and a plurality of times of port scanning, so as to determine the port connection condition of the devices in the radio frequency network.

Likewise, it may alternatively be assumed that all switches in the radio frequency network are initially in a disconnected state. The detection device may control a first switch to enter a connected state, and perform port scanning to obtain a port and a switch state that can be scanned this time. When controlling a second switch next time to enter a connected state, the detection device enables the first switch to restore the initial disconnected state, and after controlling the second switch to enter the connected state, performs port scanning again to obtain a port and a switch state that can be scanned. The detection device can perform the process for a plurality of times, to obtain port and switch state information obtained after a plurality of times of state switching and a plurality of times of port scanning, so as to determine the port connection condition of the devices in the radio frequency network.

Both the first switch and the second switch herein may include at least one switch. That is, the detection device may control one or more switches each time to perform state switching. A sequence of switches each time controlled to perform state switching is not limited in this embodiment of the present application, either. For example, a switch of the first-stage device, a switch of the second-stage device, until a switch of the last-stage device are sequentially controlled according to a cascading sequence to perform state switching, where the switches are connected in series. Alternatively, switching may be started from the last-stage device, and the switch of the last-stage device, a switch of the last-but-one-stage device, until the switch of the first-stage device are sequentially controlled according to a cascading sequence to perform state switching.

It should be understood that, in this embodiment of the present application, the switch is a switch configured to control a link connection between a device port and a port, that is, the switch is a switch on a link between a device port and a port, and can be configured to control transmission of a modulation signal on the link, such as a control signal and a scanning signal. After the switch is disconnected, a signal from the detection device cannot reach a port after the switch.

It should be further understood that, the port scanning in this embodiment of the present application may also be referred to as link scanning, and the scanning process can implement identification of a device and a port on the link. The port scanning means that the detection device sends, based on an exclusive identifier of a device port, a command by using a specific algorithm, and identifies the device port based on feedback information, fed back by the device port, for the command. Further, the detection device may further obtain other information or other functions of these devices through port scanning. A port that can be scanned in the scanning process is a port on a partial link, between the detection device and a disconnected switch, on an entire line. In other words, a port on a partial link between a scanning start point of the line and the disconnected location can be scanned, and a port on a partial link after the disconnected location cannot be scanned. For example, the detection device may send a scanning signal at the scanning start point, and the scanning signal passes through ports. After receiving the detection signal, these ports may feed back port information of the ports to the detection device, for example, port numbers. Because the scanning signal cannot reach ports after the disconnected location of the line, these ports cannot receive the scanning signal and therefore cannot feed back port information of the ports to the detection device.

Optionally, the scanning signal may be a modulation signal. A feedback signal that includes port information and that is returned by the antenna line device to the detection device may also be a modulation signal. For example, the detection device generates a scanning signal. The scanning signal is a modulation signal generated by a modulation/demodulation circuit in the detection device. The detection device couples the modulation signal with a radio frequency signal to obtain a coupled signal, and transmits the coupled signal to the antenna line device by using a radio frequency port of the detection device. After the antenna line device receives the coupled signal by using a radio frequency port, a modulation/demodulation circuit in the antenna line device demodulates the coupled signal to obtain the scanning signal by separating the coupled signal. The antenna line device generates a feedback signal based on the scanning signal. The modulation/demodulation circuit in the antenna line device modulates the feedback signal to generate a modulation signal, and returns the modulation signal to the detection device.

Therefore, in this embodiment of the present application, the detection device controls switch switching of the devices in the radio frequency network for a plurality of times, and performs port scanning each time after the switch is switched, so that the port connection relationship of the devices in the radio frequency network can be determined based on the scanned port and the corresponding switch state.

Figure 4A:
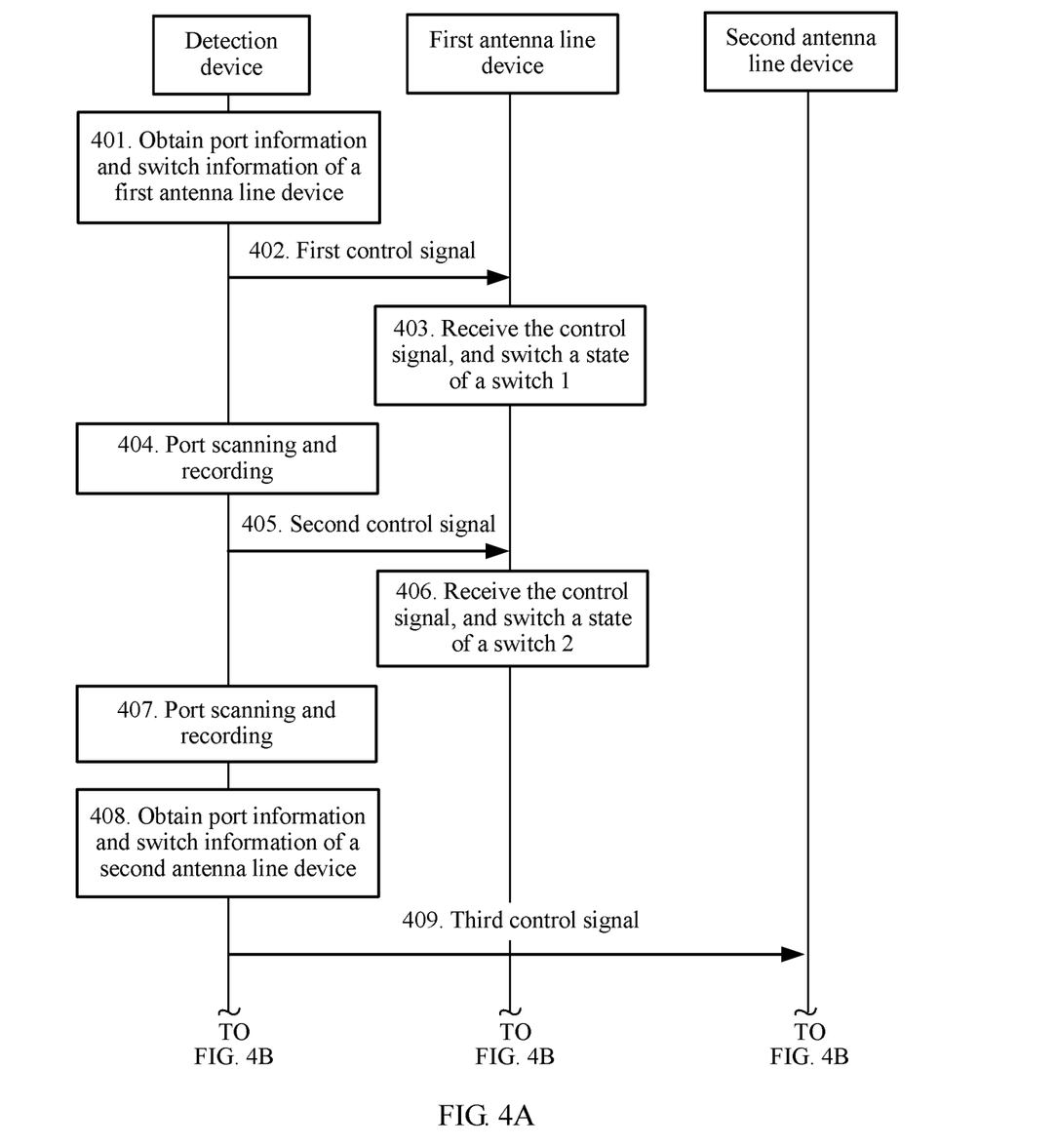
FIG. 4A and FIG. 4B are an interaction flowchart of a signal transmission method in a radio frequency network according to an embodiment of the present application.
Figure 4B:
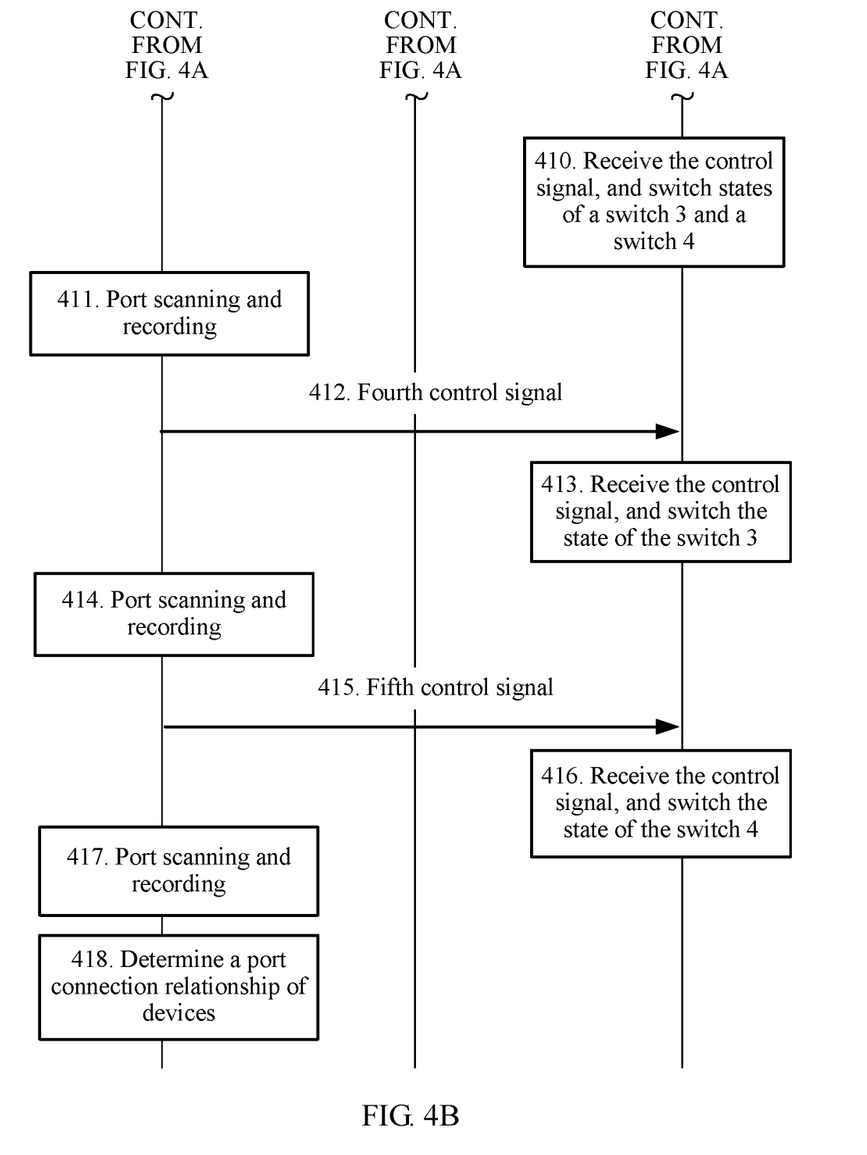

FIG. 4A and FIG. 4B are an interaction flowchart of a signal transmission method in a radio frequency network according to an embodiment of the present application. The radio frequency network in this embodiment of the present application may include a detection device, at least one antenna line device, and an antenna. The detection device, the at least one antenna line device, and the antenna are sequentially connected through a radio frequency channel. FIG. 4A and FIG. 4B are described by using an example in which two antenna line devices: a first antenna line device and a second antenna line device, are included. However, the present application is not limited thereto, and may include more antenna line devices or only one antenna line device. The detection device, the first antenna line device, the second antenna line device, and the antenna are sequentially connected in series through the radio frequency channel. It is assumed that the first antenna line device includes two switches (switch 1 and switch 2), the second antenna line device includes two switches (switch 3 and switch 4), and there is no switch in the antenna device. In addition, it is assumed that all switches in the radio frequency network are initially in a connected state. The detection device may perform port scanning when all the switches are initially in the connected state to obtain all ports, or obtain all the ports in another manner. As shown in FIG. 4A and FIG. 4B, a detection method of the radio frequency network includes the following steps.

401. The detection device obtains port information and switch information of the first antenna line device.

For example, the detection device may send a detection signal to the first antenna line device. After receiving the detection signal, the first antenna line device returns the port information and the switch information of the first antenna line device to the detection device.

Optionally, the port information of the first antenna line device may include a port in the first antenna line device and a port type, for example, whether the port is a common port, or may include a frequency band corresponding to each port. The switch information of the first antenna line device may include a switch of the first antenna line device and a location of each switch between ports, that is, each switch is located between which two ports.

402. The detection device sends a first control signal to the first antenna line device.

The first control signal is used to control the switch 1 of the first antenna line device to perform state switching, that is, the switch 1 switches from a connected state to a disconnected state.

403. The first antenna line device receives the first control signal and performs state switching of the switch 1.

Specifically, after receiving the control signal, the first antenna line device switches the switch 1 from the connected state to the disconnected state.

404. The detection device performs port scanning, and records a scanned port and a corresponding switch state.

Specifically, after the switch 1 switches from the connected state to the disconnected state, the detection device performs port scanning on at least one antenna line device and the antenna.

405. The detection device sends a second control signal to the first antenna line device.

The second control signal is used to control the switch 2 of the first antenna line device to perform state switching. In this case, the switch 1 of the first antenna line device restores the initial connected state, and the switch 2 switches from a connected state to a disconnected state.

Optionally, the switch 1 may restore the initial connected state by using a timer. When the switch 1 performs state switching in 403, that is, switches from the connected state to the disconnected state, the first antenna line device enables the timer. When the timer expires, the switch 1 restores the connected state from the disconnected state. Alternatively, the switch 1 may restore the initial connected state after the detection device sends a control signal to the first antenna line device. This is not limited in this embodiment of the present application.

406. The first antenna line device receives the second control signal and performs state switching of the switch 2.

Specifically, after receiving the second control signal, the first antenna line device switches the switch 2 from the connected state to the disconnected state, and restores the switch 1 to the initial connected state at the same time.

407. The detection device performs port scanning, and records a scanned port and a corresponding switch state.

Specifically, after the switch 2 switches from the connected state to the disconnected state, the detection device performs port scanning on at least one antenna line device and the antenna.

In this case, the detection device completes state control and port scanning of the two switches in the first antenna line device: the switch 1 and the switch 2. In this case, the detection device may determine, based on results of each time of state switching and each time of port scanning, a switch and a port located on a connection line of a to-be-detected port of the detection device. For example, it is assumed that the switch 1 and a port corresponding to the switch 1 are on the connection line of the to-be-detected port of the detection device, and the switch 2 and a port corresponding to the switch 2 are not on the connection line of the to-be-detected port of the detection device.

408. The detection device obtains port information and switch information of the second antenna line device.

For example, the detection device may send a detection signal to the second antenna line device. After receiving the detection signal, the second antenna line device returns the port information and the switch information of the second antenna line device to the detection device.

Optionally, the port information of the second antenna line device may include a port in the second antenna line device and a port type, for example, whether the port is a common port, or may include a frequency band corresponding to each port. The switch information of the second antenna line device may include a switch of the second antenna line device and a location of each switch between ports, that is, each switch is located between which two ports.

409. The detection device sends a third control signal to the second antenna line device.

The third control signal is used to control the switch 3 and the switch 4 of the second antenna line device to perform state switching, that is, the switch 3 and the switch 4 switch from a connected state to a disconnected state.

It should be noted that the switch 2 of the first antenna line device and the port corresponding to the switch 2 are not on the connection line of the detection device. In this case, it is also necessary to control the switch 2 of the first antenna line device to be in the disconnected state. It may be understood that the switch 2 may remain disconnected in subsequent switch state switching and port scanning processes.

410. The second antenna line device receives the third control signal and performs state switching of the switch 3 and the switch 4.

Specifically, after receiving the third control signal, the second antenna line device switches the switch 3 and the switch 4 from the connected state to the disconnected state.

411. The detection device performs port scanning, and records a scanned port and a corresponding switch state.

Specifically, after the switch 3 and the switch 4 switch from the connected state to the disconnected state, the detection device performs port scanning on at least one antenna line device and the antenna.

In this case, when both the switch 3 and the switch 4 of the second antenna line device are disconnected, the detection device may determine a port connection relationship between the first antenna line device and the second antenna line device based on the scanned port.

412. The detection device sends a fourth control signal to the second antenna line device.

The fourth control signal is used to control the switch 3 of the second antenna line device to perform state switching, that is, the switch 3 switches from the connected state to the disconnected state.

413. The second antenna line device receives the fourth control signal and performs state switching of the switch 3.

Specifically, after receiving the control signal, the second antenna line device switches the switch 3 from the connected state to the disconnected state.

414. The detection device performs port scanning, and records a scanned port and a corresponding switch state.

Specifically, after the switch 3 switches from the connected state to the disconnected state, the detection device performs port scanning on at least one antenna line device and the antenna.

415. The detection device sends a fifth control signal to the second antenna line device.

The fifth control signal is used to control the switch 4 of the second antenna line device to perform state switching. In this case, the switch 3 of the second antenna line device restores the initial connected state, and the switch 4 switches from the connected state to the disconnected state.

Optionally, the switch 3 may restore the initial connected state by using a timer. When the switch 3 performs state switching in 413, that is, switches from the connected state to the disconnected state, the second antenna line device may enable the timer. When the timer expires, the switch 3 restores the connected state from the disconnected state. Alternatively, the switch 3 may restore the initial connected state after the detection device sends a control signal to the second antenna line device. This is not limited in this embodiment of the present application.

416. The second antenna line device receives the fifth control signal and performs state switching of the switch 4.

Specifically, after receiving the fifth control signal, the second antenna line device switches the switch 4 from the connected state to the disconnected state, and restores the switch 3 to the initial connected state at the same time.

417. The detection device performs port scanning, and records a scanned port and a corresponding switch state.

Specifically, after the switch 4 switches from the connected state to the disconnected state, the detection device performs port scanning on at least one antenna line device and the antenna.

In this case, the detection device also completes state control and port scanning of the two switches in the second antenna line device: the switch 3 and the switch 4. The detection device may determine a port connection relationship between the second antenna line device and the antenna device based on results of each time of state switching and each time of port scanning.

418. The detection device determines a port connection relationship in the radio frequency network.

Specifically, the detection device determines a port connection relationship between devices in the radio frequency network based on the port and switch state information obtained after a plurality of times of recorded state switching and a plurality of times of port scanning in 404, 407, 411, and 414, and the port information obtained in 401 and 408.

In this case, the detection device may further determine a port connection status inside the first antenna line device in combination with the frequency band corresponding to each port in the obtained port information of the first antenna line device. For example, a connection between an input port and an output port that have a same frequency band is supported. The detection device may further determine a port connection status inside the second antenna line device in combination with the frequency band corresponding to each port in the obtained port information of the second antenna line device. For example, a connection between an input port and an output port that have a same frequency band is supported.

It can be learned that the detection device controls switch switching of the devices in the radio frequency network for a plurality of times, and performs port scanning, so that the port connection relationship of the devices in the radio frequency network can be determined based on the scanned port and the corresponding switch state.

It should be understood that the detection device may separately obtain the port information and the switch information of the first antenna line device and the second antenna line device in 401 and 408, or may obtain the port information and the switch information of the first antenna line device and the second antenna line device at a time. In other words, 401 and 408 are performed simultaneously before 402.

It should be further understood that, in this embodiment of the present application, the detection device sequentially controls at least one switch of at least one antenna line device to perform state switching. The state switching may include switching from a connected state to a disconnected state, or may include switching from a disconnected state to a connected state. For example, alternatively, all switches in the radio frequency network are initially in a disconnected state, and the detection device sequentially controls the at least one switch of the at least one antenna line device to perform state switching from the disconnected state to the connected state, so as to determine the port connection relationship based on the port and switch state information obtained after a plurality of times of state switching and port scanning.

Figure 5A:
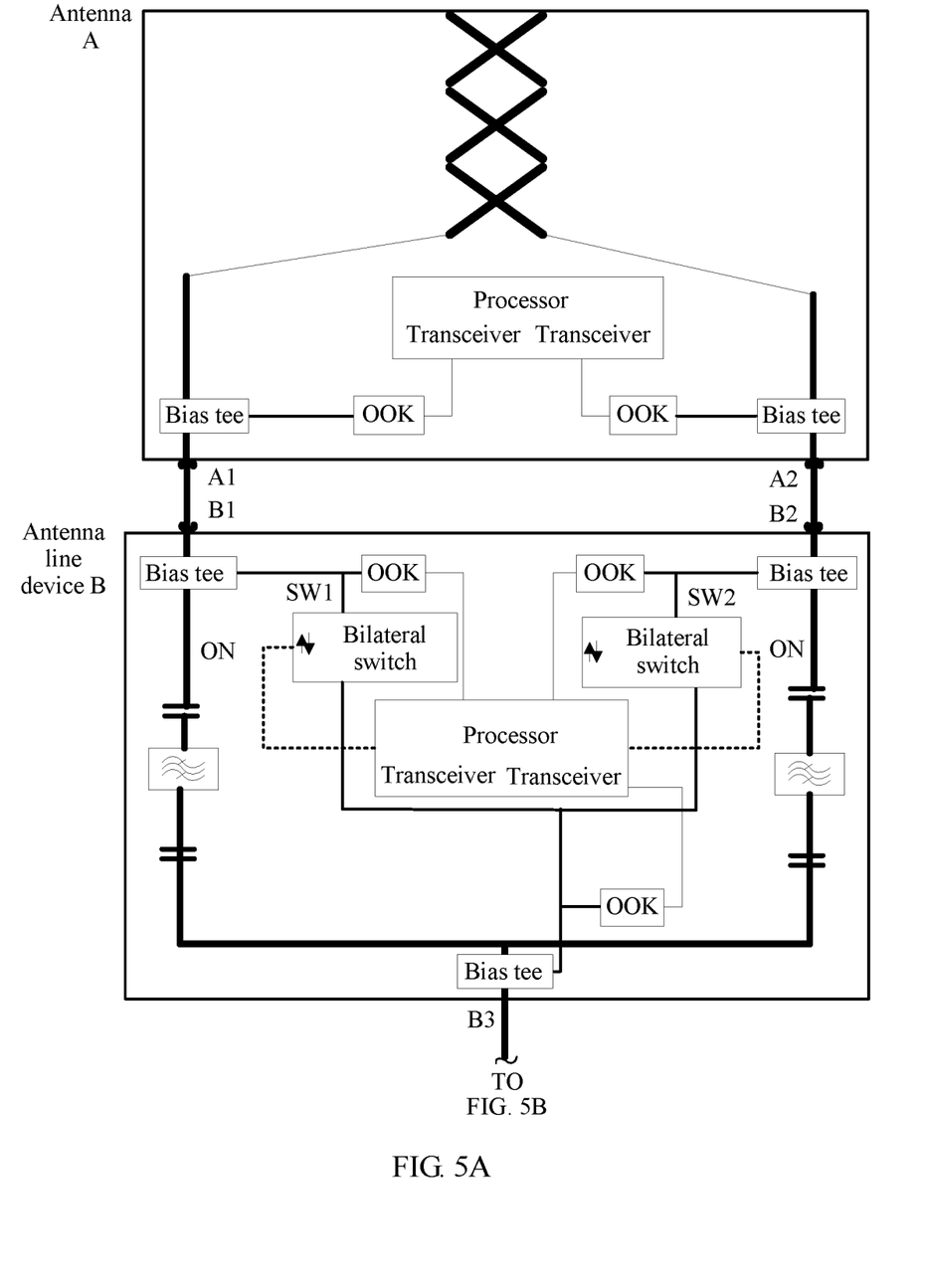
FIG. 5A and FIG. 5B are a schematic diagram of connections between devices connected in series in a radio frequency network according to an embodiment of the present application.
Figure 5B:
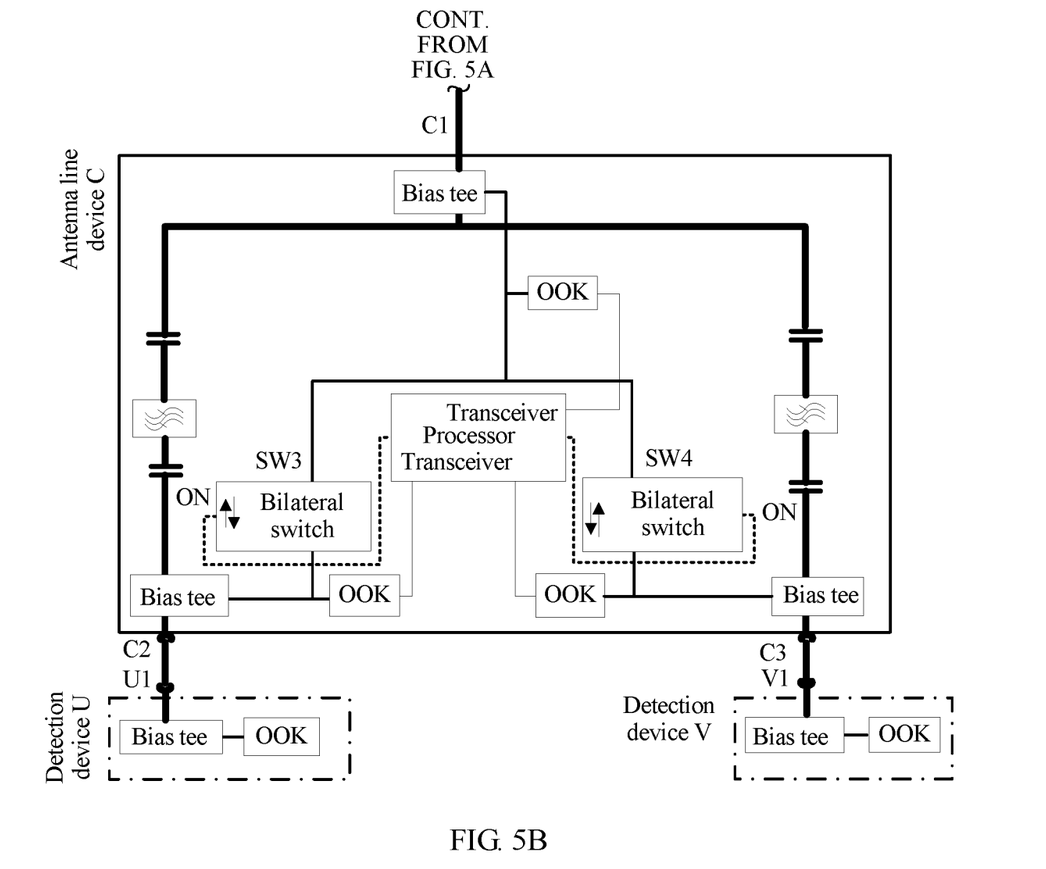

The following uses FIG. 5A and FIG. 5B as an example to describe in detail a signal transmission method in a radio frequency network according to an embodiment of the present application. The radio frequency network shown in FIG. 5A and FIG. 5B includes a detection device U, a detection device V, an antenna line device B, an antenna line device C, and an antenna A. The detection device may be a radio remote unit, and the antenna line device may include a divider and a combiner. FIG. 4A and FIG. 4B are a schematic diagram of connections between the devices connected in series in the radio frequency network according to the embodiment of the present application. The detection device U is used as an example for description, and a process of the detection device V is the same.

501. The detection device U performs port scanning by using a port U1.

First, when all switches of all devices are in a connected state, the detection device U finds, through scanning, all ports by using the port U1: a port A1, a port B1, a port A2, a port B2, a port B3, a port C1, a port C2, and a port C3. After the scanning, a switch state may be restored.

502. The detection device U sends an instruction to any of the port C1 to the port C3 of the antenna line device C, so as to obtain the following information from the antenna line device C: The port C1 in the antenna line device C is a common port, a frequency range corresponding to the port C2 is from 690 MHz to 960 MHz, a frequency range corresponding to the port C3 is from 1710 MHz to 2690 MHz, switches SW3 and SW4 exist in the antenna line device C, the SW3 is between the port C1 and the port C2, and a SW4 is between the port C1 and the port C3.

503. The detection device U sends a command to the antenna line device C to disable the SW3 for a short period of time, and then performs scanning. In this case, only the port C2 can be scanned. After the scanning, a switch state may be restored.

Therefore, the detection device U may determine a port connection relationship U1-C2 within a direct connection between the port C2 and the main device U.

504. The detection device U sends a command to the antenna line device C to disable the SW4 for a short period of time, and then performs scanning. In this case, the port A1, the port B1, the port A2, the port B2, the port B3, the port C1, and the port C2 can be scanned. After the scanning, a switch state may be restored.

Therefore, the detection device U may determine that the port C3 and the SW4 are not on a connection path of the detection device U.

505. The detection device U sends an instruction to any of the port B1 to the port B3 of the antenna line device B, so as to obtain the following information from the antenna line device B: The port B3 in the antenna line device B is a common port, a frequency range corresponding to the port B1 is from 690 MHz to 960 MHz, a frequency range corresponding to the port B2 is from 1710 MHz to 2690 MHz, switches SW1 and SW2 exist in the antenna line device B, the SW1 is between the port B1 and the port B2, and the SW1 is between the port B1 and the port B2.

506. The detection device U sends a command to the antenna line device C to disable the SW3 for a short period of time, sends a command to the antenna line device B to disable the SW1 and the SW2 for a short period of time, and then performs scanning. In this case, the port B3, the port C1, and the port C2 can be scanned. After the scanning, a switch state may be restored.

Therefore, the detection device U may determine that the port B3 is connected to the port C1, and determine a port connection relationship: port U1-port C2.

507. The detection device U sends a command to the antenna line device C to disable the SW 4 for a short period of time, sends a command to the antenna line device B to disable the SW1 for a short period of time, and then performs scanning. In this case, the port A2, the port B2, the port B3, the port C1, and the port C2 can be scanned.

Therefore, the detection device U may determine that the port A2 is connected to the port B2, and determine a port connection relationship A2-B2.

508. The detection device U sends a command to the antenna line device C to disable the SW4 for a short period of time, sends a command to the antenna line device B to attempt to disable the SW2 for a short period of time, and then performs scanning. In this case, the port A1, the port B1, the port B3, the port C1, and the port C2 can be scanned.

Therefore, the detection device U may determine that the port A1 is connected to the port B1, and determine a port connection relationship: port A1-port B1.

509. The detection device U determines that a frequency band of the port B1 corresponding to the switch SW1 is from 690 MHz to 960 MHz, and a frequency band of the port C2 corresponding to the switch SW3 is from 690 MHz to 960 MHz.

Therefore, based on the frequency bands, connection relationships in the antenna line device B are determined as port B1-port B3 and port B2-port B3, and connection relationships in the antenna line device C are determined as port C1-port C2 and port C1-port C3. In addition, port B1-port B3 is corresponding to port C1-port C2, that is, port B1-port B3-port C1-port C2. B2-B3 is corresponding to port C1-port C3, that is, port B2-port B3-port C1-port C3.

510. The detection device U may determine, in combination with an external connection relationship, that a radio frequency link connected to the U1 port of the detection device U is port U1-port C2-port C1-port B3-port B1-port A1.

It should be understood that the scanning herein is to obtain information about all ports on a connected link. For example, the detection device may send a scanning signal to the antenna line device or the antenna. After receiving the scanning signal, each port in these antenna line devices or antennas returns, based on the scanning signal, a feedback signal carrying information about the port to the detection device, so that the detection device determines, based on the received feedback signal, which ports are on the connected radio frequency link. On a link that is not connected, a port that the scanning signal cannot reach cannot receive the scanning signal and therefore cannot generate a feedback signal.

It should be further understood that, in this embodiment of the present application, the detection device sequentially controls at least one switch of at least one antenna line device to perform state switching. The state switching may include switching from a disconnected state to a connected state or switching from a connected state to a disconnected state.

It should be understood that the detection device, the at least one antenna line device, and the antenna that are sequentially connected in series through the radio frequency channel in this embodiment of the present application are described in terms of a line formed by currently detected devices, for example, a serial line formed by the detection device U, the antenna line device C, the antenna line device B, and the antenna A in FIG. 5A and FIG. 5B. A plurality of serial lines may further exist in the entire radio frequency network, for example, another serial line formed by the detection device V, the antenna line device C, the antenna line device B, and the antenna A in FIG. 4A and FIG. 4B.

Figure 6:
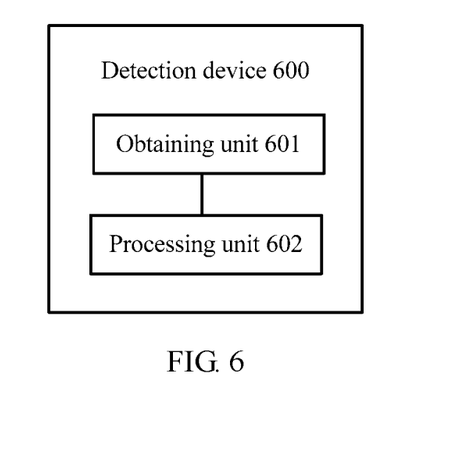
FIG. 6 is a schematic structural block diagram of a detection device according to an embodiment of the present application.

FIG. 6 is a schematic structural block diagram of a detection device according to an embodiment of the present application. The detection device 600 includes an obtaining unit 601 and a processing unit 602. The obtaining unit 601 is configured to obtain port information and switch information of the at least one antenna line device, and port information and switch information of the antenna. The processing unit 602 is configured to: sequentially control, based on the switch information, at least one switch of the at least one antenna line device to perform state switching, perform port scanning each time after the state switching is performed, and record a scanned port and a corresponding switch state; and determine a port connection relationship of devices in the radio frequency network based on port and switch state information obtained after a plurality of times of state switching and a plurality of times of port scanning, and the port information.

Optionally, the state switching includes switching from a disconnected state to a connected state, or switching from a connected state to a disconnected state.

Optionally, the port information of the at least one antenna line device includes a port number of each of a plurality of ports of the at least one antenna line device, and the port information of the antenna includes a port number of each of a plurality of ports of the antenna.

Optionally, the port information of the at least one antenna line device further includes a frequency band corresponding to each of the plurality of ports of the at least one antenna line device, and the port information of the antenna further includes a frequency band corresponding to each of the plurality of ports of the antenna.

Optionally, before the processing unit sequentially controls, based on the switch information, the at least one switch of the at least one antenna line device to switch from the first state to a second state, the detection device further includes a sending unit. The sending unit is configured to send an enabling signal to the at least one antenna line device, so that the at least one antenna line device enters a to-be-detected state based on the enabling signal.

Optionally, the detection device includes a radio remote unit RRU or a handheld test device.

Optionally, each antenna line device includes a divider, a combiner, a coupler, or a tower mounted amplifier.

The detection device 600 according to this embodiment of the present application may be corresponding to the signal transmission method according to the embodiment of the present application. In addition, units and/or modules in the detection device 600 are separately intended to implement steps in FIG. 3 and FIG. 4A and FIG. 4B and in the signal transmission method in the radio frequency network. For brevity, details are not described herein.

An embodiment of the present application further provides a radio frequency system. The radio frequency system includes a detection device, at least one antenna line device, and an antenna that are sequentially connected in series through a radio frequency channel. The detection device is configured to: obtain port information and switch information of the at least one antenna line device, and port information and switch information of the antenna; sequentially control, based on the switch information, at least one switch of the at least one antenna line device to perform state switching, perform port scanning each time after the state switching is performed, and record a scanned port and a corresponding switch state; and determine a port connection relationship of devices in the radio frequency network based on port and switch state information obtained after a plurality of times of state switching and a plurality of times of port scanning, and the port information. The at least one antenna line device is configured to sequentially perform state switching on the at least one switch based on control of the detection device.

Optionally, the state switching includes switching from a disconnected state to a connected state, or switching from a connected state to a disconnected state.

Optionally, the port information of the at least one antenna line device includes a port number of each of a plurality of ports of the at least one antenna line device, and the port information of the antenna includes a port number of each of a plurality of ports of the antenna.

Optionally, the port information of the at least one antenna line device further includes a frequency band corresponding to each of the plurality of ports of the at least one antenna line device, and the port information of the antenna further includes a frequency band corresponding to each of the plurality of ports of the antenna.

Optionally, before the detection device sequentially controls, based on the switch information, the at least one switch of the at least one antenna line device to switch from the first state to a second state, the detection device is further configured to send an enabling signal to the at least one antenna line device, so that the at least one antenna line device enters a to-be-detected state based on the enabling signal.

Optionally, the detection device includes a radio remote unit RRU or a handheld test device.

Optionally, each antenna line device includes a divider, a combiner, a coupler, or a tower mounted amplifier.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of the present application. The execution sequences of the processes should be determined according to functions and internal logic of the processes, and should not be construed as any limitation on the implementation processes of the embodiments of the present application.

A person of ordinary skill in the art may be aware that, the units and steps in the examples described with reference to the embodiments disclosed herein may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present application.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present application essentially, or the part contributing to the prior art, or all or a part of the technical solutions may be implemented in the form of a software product. The computer software product is stored in a storage medium and includes several instructions for instructing a computer device (which may be a personal computer, a server, a network device, or the like) to perform all or a part of the steps of the methods described in the embodiments of the present application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific embodiments of the present application, but are not intended to limit the protection scope of the present application. Any modification or replacement readily figured out by a person skilled in the art within the technical scope disclosed in the present application shall fall within the protection scope of the present application. Therefore, the protection scope of the present application shall be subject to the protection scope of the claims.

What is claimed is:

1. A signal transmission method in a radio frequency network, wherein the radio frequency network comprises a detection device, at least one antenna line device, and an antenna that are sequentially connected in series through a radio frequency channel, and the method comprises:

obtaining, by the detection device, port information and switch information of the at least one antenna line device, and port information and switch information of the antenna;

sequentially controlling, by the detection device based on the switch information, at least one switch of the at least one antenna line device to perform state switching, performing port scanning each time after the state switching is performed, and recording a scanned port and a corresponding switch state; and determining, by the detection device, a port connection relationship of devices in the radio frequency network based on port and switch state information obtained after a plurality of times of state switching and a plurality of times of port scanning, and the port information.

2. The method according to claim 1, wherein the state switching comprises:

switching from a disconnected state to a connected state, or switching from a connected state to a disconnected state.

3. The method according to claim 1, wherein the port information of the at least one antenna line device comprises a port number of each of a plurality of ports of the at least one antenna line device, and the port information of the antenna comprises a port number of each of a plurality of ports of the antenna.

4. The method according to claim 3, wherein the port information of the at least one antenna line device further comprises a frequency band corresponding to each of the plurality of ports of the at least one antenna line device, and the port information of the antenna further comprises a frequency band corresponding to each of the plurality of ports of the antenna.

5. The method according to claim 1, wherein before the detection device sequentially controls, based on the switch information, the at least one switch of the at least one antenna line device to switch from a first state to a second state, the method further comprises:

sending an enabling signal to the at least one antenna line device, so that the at least one antenna line device enters a to-be-detected state based on the enabling signal.

6. The method according to claim 1, wherein the detection device comprises a radio remote unit (RRU) or a handheld test device.

7. The method according to claim 1, wherein each antenna line device comprises a divider, a combiner, a coupler, or a tower mounted amplifier.

8. A radio frequency system, wherein the radio frequency system comprises a detection device, at least one antenna line device, and an antenna that are sequentially connected in series through a radio frequency channel, and the detection device is configured to:

obtain port information and switch information of the at least one antenna line device, and port information and switch information of the antenna;

sequentially control, based on the switch information, at least one switch of the at least one antenna line device to perform state switching, perform port scanning each time after the state switching is performed, and record a scanned port and a corresponding switch state; and determine a port connection relationship of devices in the radio frequency system based on port and switch state information obtained after a plurality of times of state switching and a plurality of times of port scanning, and the port information.

9. The system according to claim 8, wherein the state switching comprises:
switching from a disconnected state to a connected state, or switching from a connected state to a disconnected state.

10. The system according to claim 8, wherein the port information of the at least one antenna line device comprises a port number of each of a plurality of ports of the at least one antenna line device, and the port information of the antenna comprises a port number of each of a plurality of ports of the antenna.

11. The system according to claim 10, wherein the port information of the at least one antenna line device further comprises a frequency band corresponding to each of the plurality of ports of the at least one antenna line device, and the port information of the antenna further comprises a frequency band corresponding to each of the plurality of ports of the antenna.

12. The system according to claim 8, wherein before the detection device sequentially controls, based on the switch information, the at least one switch of the at least one antenna line device to switch from the first state to a second state, the detection device is further configured to:
send an enabling signal to the at least one antenna line device, so that the at least one antenna line device enters a to-be-detected state based on the enabling signal.

13. The system according to claim 8, wherein the detection device comprises a radio remote unit (RRU) or a handheld test device.

14. The system according to claim 8, wherein each antenna line device comprises a divider, a combiner, a coupler, or a tower mounted amplifier.

15. A detection device, comprising:
a processor;
memory coupled to the processor, the memory comprising instructions that, when executed by the processor, cause the first device to:
obtaining, by the detection device, port information and switch information of the at least one antenna line device, and port information and switch information of the antenna;
sequentially controlling, by the detection device based on the switch information, at least one switch of the at least one antenna line device to perform state switching, performing port scanning each time after the state switching is performed, and recording a scanned port and a corresponding switch state; and
determining, by the detection device, a port connection relationship of devices in the radio frequency network based on port and switch state information obtained after a plurality of times of state switching and a plurality of times of port scanning, and the port information.

16. The device according to claim 15, wherein the state switching comprises:
switching from a disconnected state to a connected state, or switching from a connected state to a disconnected state.

17. The device according to claim 15, wherein the port information of the at least one antenna line device comprises a port number of each of a plurality of ports of the at least one antenna line device, and the port information of the antenna comprises a port number of each of a plurality of ports of the antenna.

18. The device according to claim 17, wherein the port information of the at least one antenna line device further comprises a frequency band corresponding to each of the plurality of ports of the at least one antenna line device, and the port information of the antenna further comprises a frequency band corresponding to each of the plurality of ports of the antenna.

19. The device according to claim 15, wherein before the detection device sequentially controls, based on the switch information, the at least one switch of the at least one antenna line device to switch from a first state to a second state, the method further comprises:
sending an enabling signal to the at least one antenna line device, so that the at least one antenna line device enters a to-be-detected state based on the enabling signal.

20. The method according to claim 15, wherein the detection device comprises a radio remote unit (RRU) or a handheld test device.

* * * * *